United States Patent

[11] 3,527,174

[72] Inventor Ralph B. Lay
 Columbus, Indiana
[21] Appl. No. 766,776
[22] Filed Oct. 11, 1968
[45] Patented Sept. 8, 1970
[73] Assignee Hamilton Cosco, Inc.
 Columbus, Indiana
 a corporation of Indiana

[54] FOLDABLE SERVING CART
 8 Claims, 5 Drawing Figs.
[52] U.S. Cl. ............................................. 108/115,
 280/79.3
[51] Int. Cl. ............................................. A47b 3/00
[50] Field of Search ............................................. 108/115,
 124, 119, 113; 312/262; 211/132, 149; 280/79.3,
 36, 39, 42

[56] References Cited
 UNITED STATES PATENTS
 447,239  2/1891  Babcock et al. .............. 312/262
 982,477  1/1911  Cavanagh ....................... 211/149
 2,005,566  6/1935  Schwabe ......................... 280/79.3X
 2,599,670  6/1952  Thomas .......................... 211/149X
 2,938,632  5/1960  Mondineu ....................... 211/149X
 3,007,708  11/1961  Ochs .............................. 280/79.3
 3,202,438  8/1965  Panknin ......................... 280/42

Primary Examiner—James T. McCall
Attorney—Trask, Jenkins, and Hanley

ABSTRACT: A foldable serving cart in which there is provided a pair of end frames interconnected along one side of the cart and swingable about a pair of vertical axes between an overlapping retracted position and a parallel extended position. A pair of shelves are swingably interconnected to the end frames at said one side of the cart on vertically spaced horizontal axes. The shelves are swingable about said horizontal axes between an overlapping generally vertical retracted position and an erected position in which they are disposed in parallel horizontal planes and supported by the sides of said end frames remote from said one side of the cart.

Patented Sept. 8, 1970

3,527,174

INVENTOR.
RALPH B. LAY
BY
*Trask, Jenkins & Hanley*
ATTORNEYS

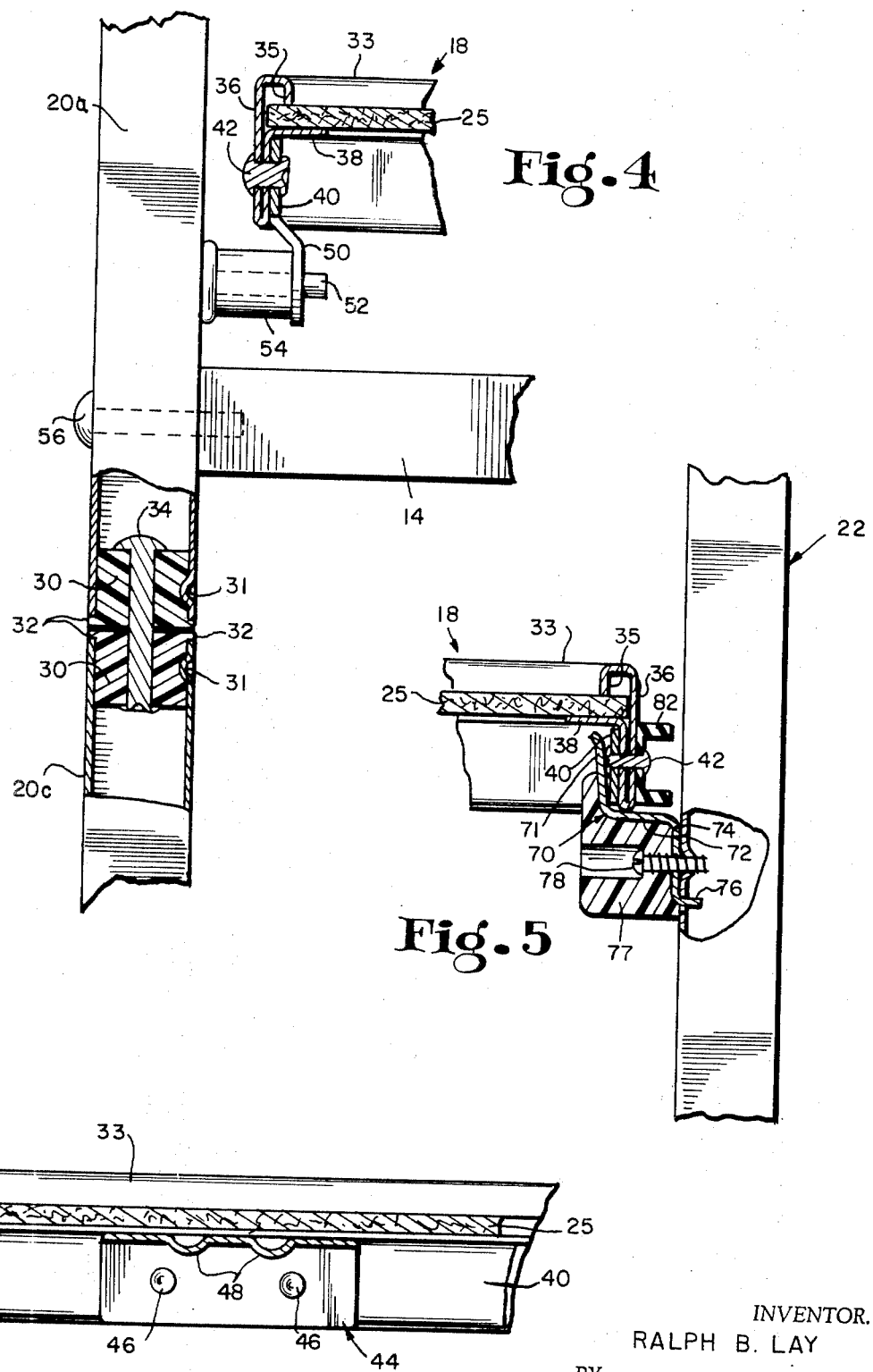

FOLDABLE SERVING CART

SUMMARY OF THE INVENTION

In accordance with one form of the invention, there is provided a serving cart having a pair of end frames. Each of the end frames comprises a pair of uprights having casters mounted thereon and interconnected by transverse braces. The uprights on the end frames at one side of the cart are provided with intermediate sections connected to upper and lower sections with the intermediate sections on the two end frames being interconnected by longitudinally extending braces. The upper and lower sections are swingably connected to the intermediate sections whereby the end frames are swingable about a pair of longitudinally spaced vertical axes between an overlapping retracted position and a generally parallel extended position.

A pair of vertically spaced shelves having peripherally extending moldings are supported by said end frames. Each of said shelves is swingably interconnected along one of its sides to the sectioned uprights on the end frames on a horizontal axis. The opposite sides of said shelves are interlockingly engageable with brackets mounted on the non-sectioned uprights of the end frames for thus supporting said shelves in extended horizontal positions when the end frames are in their extended positions. Thus, the cart can be folded into a retracted or collapsed position by swinging the shelves upwardly to disengage them from the brackets on the end frames and then swinging one of said end frames into a retracted position abutting one face of the longitudinally extending braces. The shelves are then swung downwardly into overlapping retracted positions along the opposite faces of said longitudinal braces with the other end frame being swung into its retracted position overlapping the retracted shelves and other end frame. The cart is movable into an extended operative position by merely reversing the sequence just described, and is retained in such extended position by the shelves interlockingly engaging the brackets on the end frames.

BRIEF DESCRIPTION OF THE DRAWINGS

The accompanying drawings illustrate the invention. In such drawings:

FIG. 3 is an enlarged fragmentary vertical section taken along the line 3—3 of FIG. 1;

FIG. 4 is an enlarged fragmentary vertical section taken along the line 4—4 of FIG. 1; and FIG. 5 is an enlarged fragmentary vertical section taken along the line 5—5 of FIG. 1.

DETAILED DESCRIPTION OF THE PREFERRED EMBODIMENT

Figure 1:
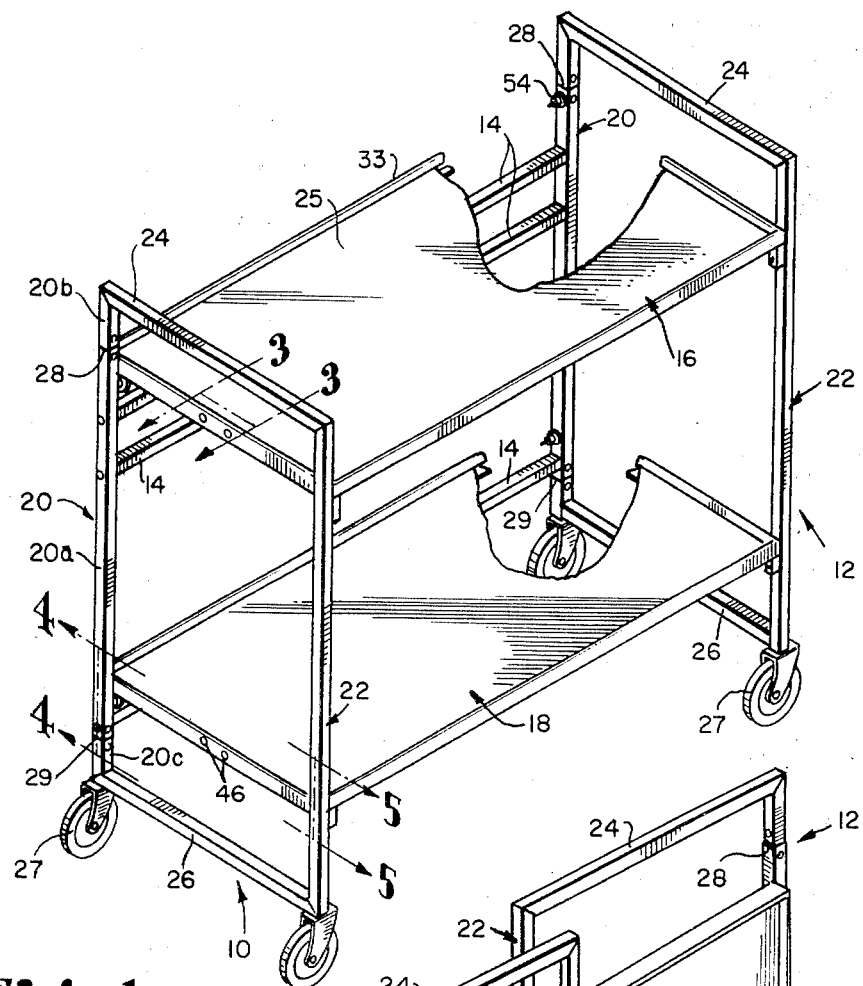
FIG. 1 is an isometric view of a foldable serving cart embodying the invention.

As shown in the drawings, the invention comprises a foldable serving cart having a pair of end frames 10 and 12 supporting a pair of vertically spaced shelves 16 and 18 and interconnected along one of their sides by a pair of vertically spaced longitudinal braces 14. Conveniently, the end frames 10 and 12 are constructed from metal tubing, and each comprises a pair of uprights 20 and 22 interconnected at their upper and lower ends by a pair of horizontally disposed cross stretches 24 and 26. Casters 27 are mounted on the lower ends of the uprights so that the serving cart can be easily moved from one location to another.

As shown in FIGS. 1 and 4, each of the uprights 20 is formed by an intermediate section 20a connected to the braces 14 and an upper and lower section 20b and 20c to thus provide each such upright with a pair of vertically spaced swivel joints 28 and 29. The joints 28 and 29 are located at positions above the upper shelf 16 and below the lower shelf 18 to permit the upper and lower ends of the end frames to swing about the axes of the uprights 20. Each of the swivel joints is formed by a pair of opposed plugs 30 inserted into the adjacent ends of a pair of the upright sections. The plugs are held in position in said sections by offsets 31 formed in said sections to bind against the plugs and by shoulders 32 formed on said plugs to engage the ends of said sections. A pin 34 extends through each pair of the plugs 30 to thus swingably interconnect each pair of adjacent upright sections. As shown in FIG. 1, the braces 14 interconnect the uprights 20 at the intermediate sections 20a between the swivel joints 28 and 29.

The shelves 16 and 18 are identical in construction, and as shown in FIG. 4, each comprises a top 25 having a peripheral molding 33 extending therearound. Said molding has a downwardly open channeled upper end section 35 bearing against the upper face of the shelf top 25. The outer leg of said section is continuous with a vertically extending intermediate section 36 projecting downwardly below the top 25 and folded inwardly and upwardly against itself. The inner upper end of the intermediate section 36 terminates in an inwardly projecting flange 38 bearing against the lower face of the shelf top 25. Thus, the top 25 is bindingly retained between the molding section 35 and flange 38.

Each of the shelves is braced by a pair of braces 40 extending transversely of the shelf. The end brace 40 abuts the inner face of the folded section 36 of the molding 33 and is attached thereto by rivets 42. As shown in FIG. 3, a longitudinal brace 44 also extends beneath the top 25 to support it longitudinally, said brace 44 having its ends bent downwardly and attached by rivets 46 to the end braces 40. Desirably, the longitudinal brace 44 is ribbed, as at 48, to increase its strength.

As shown in FIG. 4, each of the shelves is pivotally connected along one of its sides to the upright sections 20a. To this end, a finger 50 projects downwardly from each end brace 40. A hole is provided in each finger 50 and is received over a pin 52 fixedly mounted on the inner face of the adjacent upright section 20a. Conveniently, a spacer 54 is mounted on the pin 52 between the finger 50 and upright section to reduce any friction and to prevent the upright from being marred during the swinging movements of the finger. Thus, the shelves are free to rotate on the pins 52, and are held thereon by the fingers 50 on the end braces 40.

The shelves are releasably connected along their opposite sides to the uprights 22. Each such connection is identical, and as shown in FIG. 5, each is formed by a bracket 70 having a vertically extending upper leg 71 set inwardly from the inner face of its associated upright 22. The lower end of the leg 71 terminates in a horizontal supporting surface 72 whose end remote from the leg 71 terminates in a lower vertical leg 74 abutting the inner face of the upright 22. The lower end of the leg 74 is bent horizontally outwardly to provide a tab 76 received in a slot in the upright. A guard 77 extends over the lower portion of the bracket and a screw 78 extends through said guard and the bracket leg 74 for reception in the upright 22 for mounting said guard and bracket thereon.

The molding sections 36 on the shelves are receivable between the bracket legs 71 and the uprights 22 to rest on the bracket stretches 72 for thus supporting said shelves in their horizontal extended positions. Conveniently, in order to prevent the molding from scratching the uprights as it is inserted between said uprights and the brackets 70, resilient bumpers 82 are mounted on the outer faces of the molding sections 36, as by the rivets 42.

Figure 2:
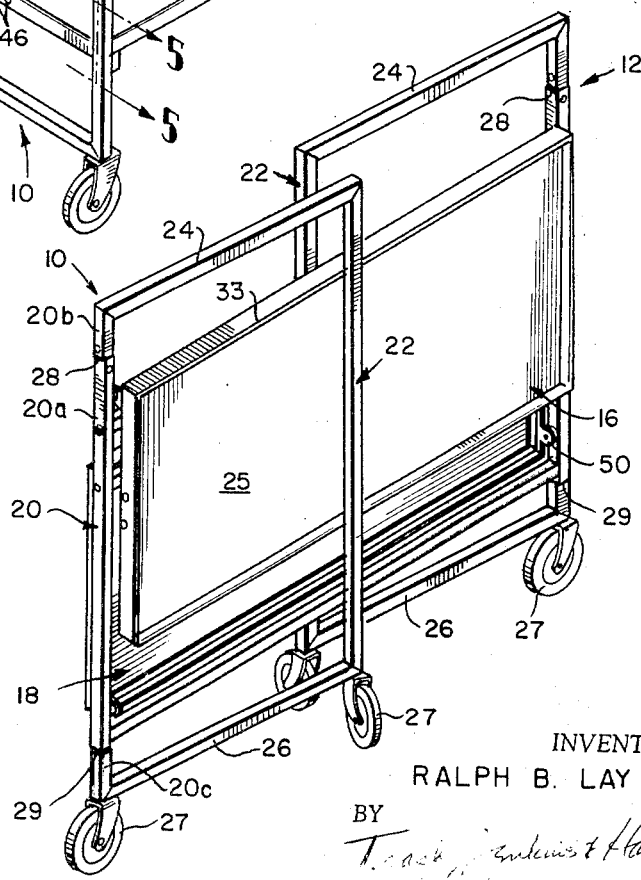
FIG. 2 is an isometric view of the serving cart shown in FIG. 1, but showing said cart in a folded retracted position.

In order to fold the cart into its collapsed position shown in FIG. 2, the edges of the shelves 16 and 18 adjacent the uprights 22 are lifted upwardly out of the brackets 70, and the end frames are swung outwardly about the axes of the pins 34 to thus permit said shelves to swing downwardly about the pins 52 into their vertically extending retracted positions in front of the braces 14. The end frame 12 is then swung further outwardly about the axis of pins 34 through an arc of about 270° until it abuts the faces of the braces 14 opposite the brace faces engaging the retracted shelves 16 and 18. The frame 10 is then swung inwardly about the axis of its pins 34 until it is in an overlapping position with respect to the retracted shelves 16 and 18, and thus generally in overlapping parallelism with said shelves and the retracted frame 12.

To move the cart from its collapsed position shown in FIG. 2 to its extended operative position shown in FIG. 1, the end frames 10 and 12 are swung outwardly into a generally parallel position in which they are generally normal to the plane of the braces 14. The shelves 16 and 18 are then swung upwardly about the axis of pins 52 and are inserted into the brackets 70 to thus rigidly interlock said shelves and end frames in their extended operative positions.

I claim:

1. A foldable cart, comprising a pair of end frames and a shelf supported on said end frames, each said end frame having a pair of horizontally interconnected uprights, said shelf being swingably interconnected to one of the uprights on each end frame on a horizontal axis and releasably interlockingly engageable with the other upright on each end frame for movement between an extended horizontal position and a retracted vertical position, a pair of swivel joints on each of said one uprights above and below said shelf whereby said end frames are swingable about the axes of said swivel joints between a retracted overlapping position and an extended shelf-supporting position, and means interconnecting said one uprights between said swivel joints.

2. The invention as set forth in claim 1 in which said one uprights are formed from an intermediate section swingably connected to upper and lower sections, said means interconnects the intermediate sections on said one uprights of said end frames, and said upper and lower sections on each of said one uprights are interconnected to said other upright by cross braces.

3. The invention as set forth in claim 1 in which said shelf is provided with a peripheral molding, and said means comprises a bracket mounted on each of said other uprights adapted to receive said molding.

4. The invention as set forth in claim 1 in which said shelf is provided with a peripheral molding, fingers project downward from said molding, and said one uprights have pins projecting therefrom pivotally supported in said fingers for swingably interconnecting said shelf to said one uprights.

5. A foldable cart, comprising a pair of end frames rigidly interconnected along one side of said cart, means providing a pair of longitudinally spaced vertical axes on said end frames along said one side of said cart whereby said end frames are swingable about said axes between a retracted position generally parallel to said one side of the cart and an extended position generally normal to said one side of the cart, and a shelf swingably interconnected to said end frames at said one side of said cart on a horizontal axis and releasably engageable with said end frames along the side of said cart opposite said one side whereby said shelf is releasably supported in an extended horizontal position and is movable into a retracted generally vertical position.

6. The invention as set forth in claim 5 in which each of said end frames has a first upright along said one side of said cart provided with a pair of vertically spaced swivel joints and a second upright along the opposite side of said cart provided with means releasably engageable with said shelf.

7. The invention as set forth in claim 5 in which said shelf has a plurality of braces and a peripheral molding, said molding being swingably interconnected to said end frames along said one side of the cart and releasably engageable with said end frames along the side of the cart opposite said one side.

8. A foldable cart, comprising a pair of end frames each having first and second uprights, each of said first uprights having an intermediate section swingably connected to upper and lower sections on vertical axes, means rigidly interconnecting said intermediate sections on said end frames, means rigidly interconnecting said upper and lower sections to said second uprights, a pair of shelves swingably interconnected to said intermediate sections on a pair of vertically spaced horizontal axes, and means on said second uprights engageable with said shelves for releasably supporting said shelves in vertically spaced horizontal positions when said end frames are swung about said vertical axes into positions projecting outwardly from said means rigidly interconnecting said intermediate sections.